F. J. DOLAN.
FRUIT CLIPPERS.
APPLICATION FILED MAR. 21, 1911.
1,037,737.
Patented Sept. 3, 1912.
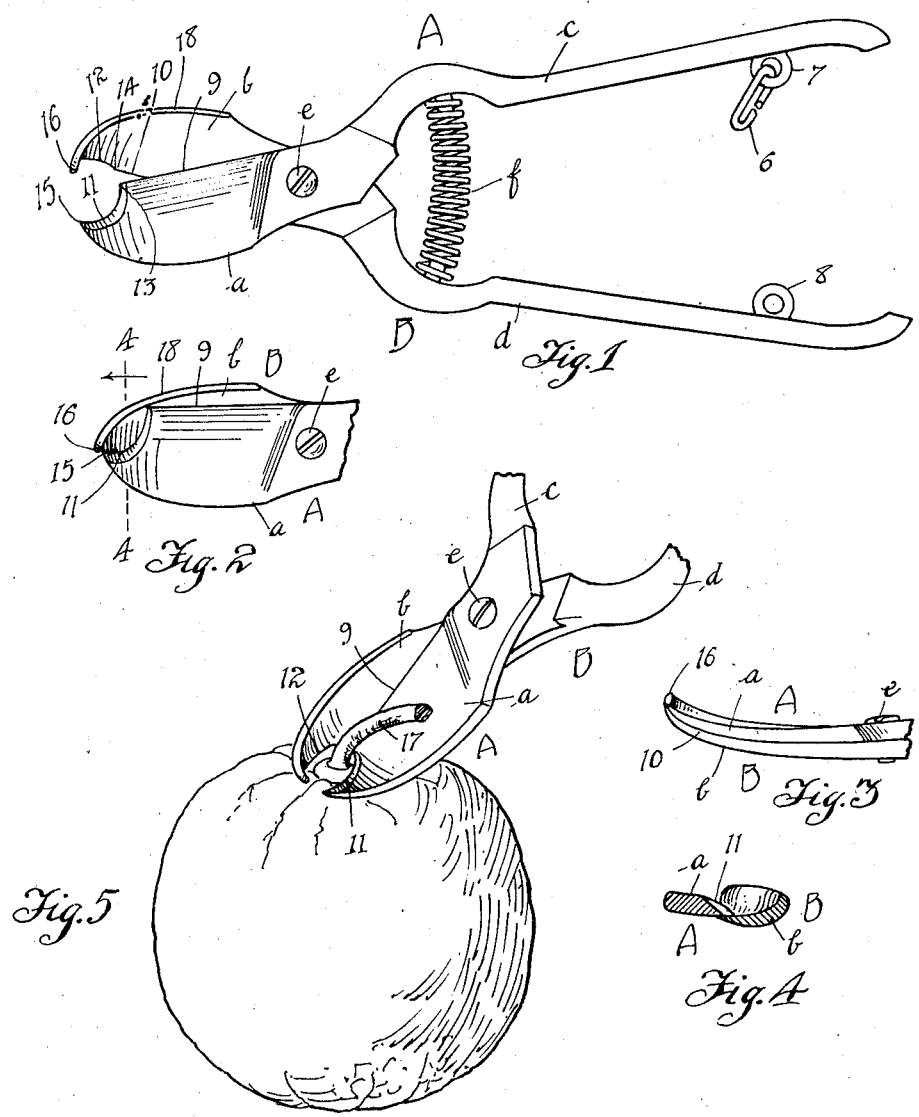
Witnesses,
Geoffrey G. Holt.
E. E. Mosher
Inventor,
Felix John Dolan.
By Beckhart Blakeslee
his Attorneys.

UNITED STATES PATENT OFFICE.

FELIX JOHN DOLAN, OF RIVERSIDE, CALIFORNIA.

FRUIT-CLIPPERS.

1,037,737.  Specification of Letters Patent.  Patented Sept. 3, 1912.

Application filed March 21, 1911. Serial No. 615,986.

*To all whom it may concern:*

Be it known that I, FELIX JOHN DOLAN, a citizen of the United States, residing at Riverside, in the county of Riverside and State of California, have invented new and useful Improvements in Fruit-Clippers, of which the following is a specification.

This invention relates to fruit clippers, such as are employed in clipping citrus and other fruits from the limbs or branches upon which they are grown; and it has for its object to provide improved clippers of the character stated which will be superior in point of simplicity and inexpensiveness of construction, positiveness of operation, facility and convenience in use, and general efficiency, and the use of which will obviate injury to or bruising of the fruit and will permit of cutting the fruit stems close to the body of the fruit.

In employing fruit clippers of standard form, it is practically impossible to sever the stem so close to the body of the fruit that no projecting part will remain to puncture the wrapper with which the fruit is finally provided, and also puncture the wrappers of adjacent pieces of fruit when the fruit is packed, further causing injury to the fruit, wrappers of which are so punctured. Furthermore, the relatively sharp or unbroken edges of the jaws or blades, or of that one which is directed toward the fruit in puncturing the stem of the same prior to cutting the same, is frequently brought into contact with the fruit and mars or injures the same appreciably. The cutting action of fruit clippers as now constructed is also lacking in that positiveness and cleanness of performance which is a desideratum when speed and accuracy of performance are taken into consideration.

In accordance with my invention, I provide fruit clippers which obviate the above mentioned disadvantages and at the same time provide those advantages and points of superiority initially above referred to.

The invention consists in the novel provision, construction, formation and combination of parts, members and features all as hereinafter described, shown in the drawing, and finally pointed out in claim.

In the drawing: Figure 1 is an upper face view of fruit clippers constructed and organized in accordance with the invention; Fig. 2 is a similar fragmentary view, showing the cutting jaws or blades which latter are in closed relation, the same being shown in Fig. 1 in open relation; Fig. 3 is a fragmentary side or edge view of the jaws or blades shown in Fig. 2; Fig. 4 is a transverse sectional view taken upon the line 4—4, Fig. 2, and looking in the direction of the appended arrow; and, Fig. 5 is a perspective view showing the application of the jaws or blades of the clippers to an orange, prior to the act of severing the stem thereof.

Corresponding parts in all the figures are denoted by the same reference characters.

Referring with particularity to the drawing, the improved fruit clippers shown therein as embodying the invention comprise two pivoted members, A and B, which are respectively provided with jaws or blades $a$ and $b$, the members being likewise provided with grips or handles $c$ and $d$ respectively, between which latter and said jaws or blades the members A and B are pivotally connected by a screw or pin $e$. Tension means such as a coil spring $f$ is disposed between the handles or grips $c$ and $d$, normally urging the jaws or blades $a$ and $b$ apart. The grips or handles $c$ and $d$ are of considerable extension, affording a convenient and sufficient means for grasping and manipulating the clippers, and a split ring 6 is provided which may co-act with eyes 7 and 8 upon the grips or handles to hold the same together in compact form, against the action of the tension means $f$.

The jaws $a$ and $b$ are provided inward of their end portions with straight cutting edges 9 and 10, which may co-act to cut, during commencement of the movement of the jaws to bring the latter together, and the outer end of the jaws are provided respectively with curved cutting edges, 11 and 12, bowed away from each other and terminating respectively at their inner ends in shoulders 13 and 14, and at their outer ends in points 15 and 16. The shoulders 13 and 14 are arranged to registrate when the jaws are brought together at their outer ends, after the straight cutting edges 9 and 10 have overlapped. The curved cutting edge 11 is beveled, and the curved cutting edge 12 is plain, and when they are brought together they emerge into a common curvature within the confines of which the stem 17 of the fruit is gripped and severed. The outer edge portion of the jaw $b$, opposite the straight cutting edge 10 and the curved cutting edge 12, is provided with a curved guard or flange 18 extending from the point 16 to a point considerably inward of the registration of the shoulder 14; and the formation and relation of the parts is such that the shoulder 13 engages with the guard or flange, as shown in Fig. 2 when the jaws are in closed relation; and with the jaws in closed relation the point 16, into which merges the curvature of the curved cutting edge 12, overlaps the point 15 upon the jaw a. The guard or flange 18 projects appreciably above the upper face of the jaw b, the upper face of which jaw and the upper face of the jaw a are merged into a concavity, the lower faces of said jaws being merged into a convexity, all as clearly shown in the drawing, and particularly in Fig. 3, whereby the jaws are given substantially a spoon shaped conformation, which is enhanced by the beveled formation of the cutting edge 11 and the up-standing formation of the guard or flange 18. The point 16 is rounded off so as not to puncture or injure the fruit if it is brought into contact with same.

In using the clippers the jaw b is presented toward the fruit in moving the clippers into position for action, and the rounded guard or flange 18 prevents the jaw b from injuring or marring the fruit, as does the rounded point 16 thereof; and when the jaws are in closed relation the rounded point 16 overlaps the relatively sharp point 15 and prevents injury thereby to any object with which the clippers may be brought into contact. Because of the dished or combined concave and convex formation of the jaws a and b, particularly its outer ends thereof which are provided with the curved cutting edges 11 and 12, such outer ends may be brought to bear upon the fruit, such as the orange shown in Fig. 5, at the very base of the stem 17, and the stem may be severed close to the body of fruit or at the very base of the stem, or close to the cap or foot which joins the stem with the orange. The curved cutting edges acting in opposition one to the other, initiate the cutting action as soon as they jointly engage the stem, and produce a clean quick cut which enables the operator to proceed rapidly in the clipping operation. The beveled curved cutting edge 11 operates in connection with the plain curved cutting edge 12 with high efficiency.

The entire device as organized is adapted for the performance of its functions with the highest speed and efficiency, and meets with all the conditions of service which are imposed upon a device of the class of the character under consideration.

Having thus described my invention, I claim and desire to secure by Letters Patent:

Improved clippers of the character described, comprising two pivoted members provided with jaws, one of said jaws being provided at one side with an up-standing guard or flange, both jaws having straight cutting edges and one jaw having likewise a curved cutting edge and being provided with a shoulder between the straight and curved cutting edges co-acting with said guard or flange to limit relative movement of the jaws in one direction.

In testimony whereof, I have subscribed my name to this specification in the presence of two subscribing witnesses.

FELIX JOHN DOLAN.

Witnesses:
RAYMOND I. BLAKESLEE,
CHARLES D. WARDEN.